(12) United States Patent
Katz

(10) Patent No.: US 6,394,041 B1
(45) Date of Patent: May 28, 2002

(54) POOCH POOH CATCHER

(76) Inventor: Sidney I. Katz, 8092 Windy Sea Cir., Huntington Beach, CA (US) 92647

( * ) Notice: Subject to any disclaimer, the term of this patent is extended or adjusted under 35 U.S.C. 154(b) by 0 days.

(21) Appl. No.: 09/487,162

(22) Filed: Jan. 19, 2000

(51) Int. Cl.[7] ............................................. A01K 23/00
(52) U.S. Cl. ....................................................... 119/868
(58) Field of Search ................................. 119/868, 867; 604/385.05, 385.08, 317, 385.19; 220/495.05, 495.07, 495.06

(56) References Cited

U.S. PATENT DOCUMENTS

| | | |
|---|---|---|
| 3,656,459 A | 4/1972 | Missud |
| 3,786,787 A | 1/1974 | Weinberger |
| 3,817,217 A | 6/1974 | Matuka et al. |
| 3,875,903 A | 4/1975 | Sarvary |
| 4,095,562 A | 6/1978 | Graham |
| 4,103,645 A | 8/1978 | Tyler |
| 4,156,402 A | 5/1979 | Naiztat |
| 4,182,331 A * | 1/1980 | Rodriguez .................. 128/271 |
| 4,269,148 A | 5/1981 | Holley-Donawa |
| 4,353,330 A | 10/1982 | Baumgartner |
| 4,444,152 A * | 4/1984 | Berardo ........................ 119/95 |
| 4,502,417 A * | 3/1985 | Jenkins ........................ 119/868 |
| 4,510,887 A | 4/1985 | Lincoln et al. |
| 4,537,153 A | 8/1985 | Vidal |
| 4,658,989 A * | 4/1987 | Bonerb ........................ 222/105 |
| 4,779,573 A | 10/1988 | Vidal |
| 4,813,949 A | 3/1989 | O'Rourke |
| 4,917,683 A | 4/1990 | Thompson |
| 4,969,419 A * | 11/1990 | Fong ............................ 119/95 |
| 5,146,874 A | 9/1992 | Vidal |
| 5,355,836 A | 10/1994 | Vallery |
| 5,386,801 A | 2/1995 | Chinn et al. |
| 5,386,802 A * | 2/1995 | Hang-Fu ..................... 119/868 |
| 5,427,059 A | 6/1995 | Logan |
| 5,813,369 A | 9/1998 | Fujinaga |

* cited by examiner

*Primary Examiner*—Charles T. Jordan
*Assistant Examiner*—Jordan Lofdahl
(74) *Attorney, Agent, or Firm*—Stetina Brunda Garred & Brucker

(57) ABSTRACT

An excrement catching device for a dog wherein the dog has a tail, a rear end and a stomach portion. The device comprises a receptacle sized and configured to be placeable over the rear end of the dog. The receptacle has a rear portion and a forward portion for attachment of a stomach strap and a tail strap. The tail strap is placeable over the tail of the dog and attached to the rear portion of the receptacle. The tail strap is operative to secure the receptacle to the tail of the dog. The stomach strap is placeable over the stomach portion of the dog and attached to the forward portion of the receptacle. The stomach strap is operative to secure the receptacle adjacent to the stomach of the dog. Accordingly the stomach strap and the tail strap position the receptacle in a location whereat the receptacle may catch the excrement of the dog.

18 Claims, 4 Drawing Sheets

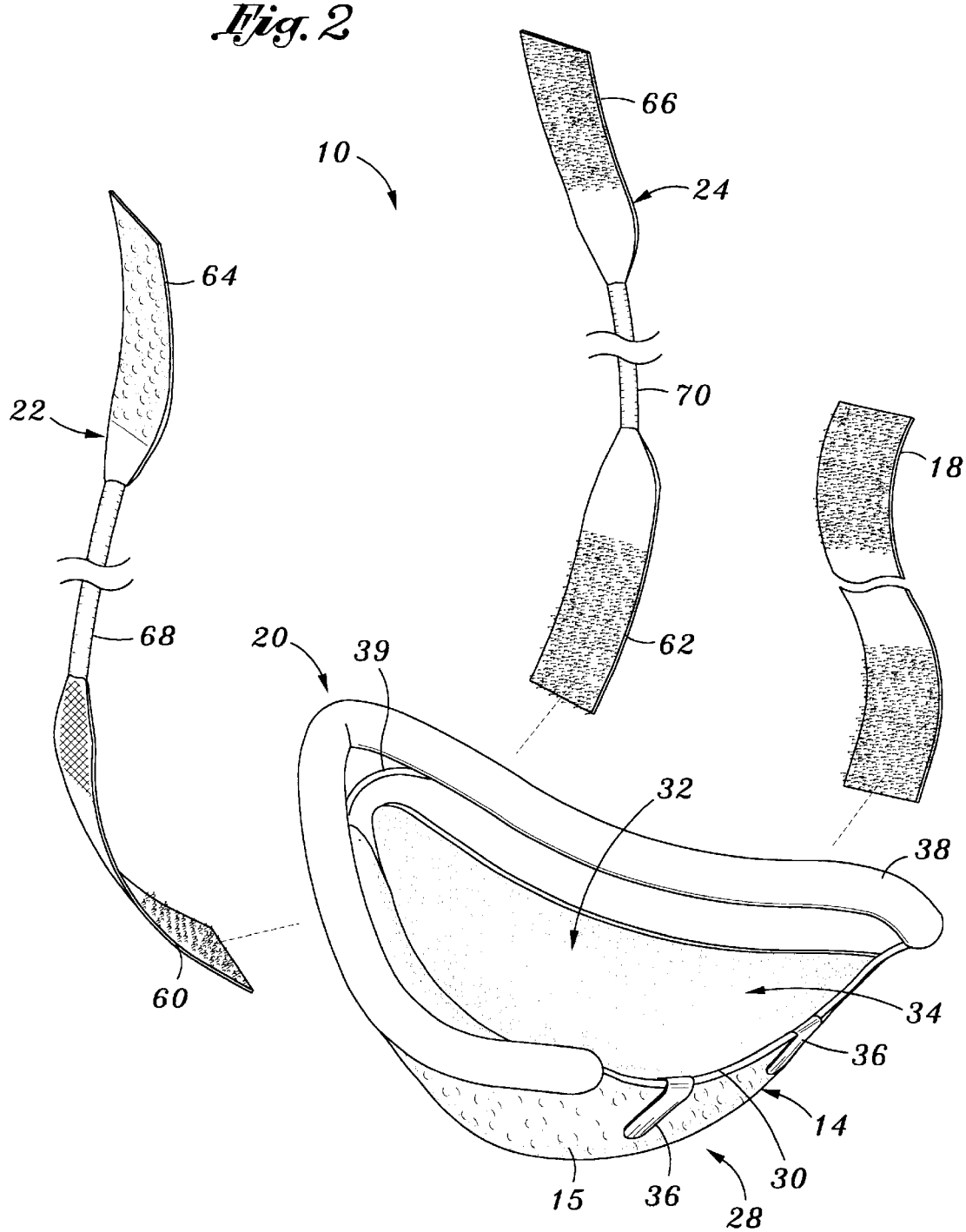

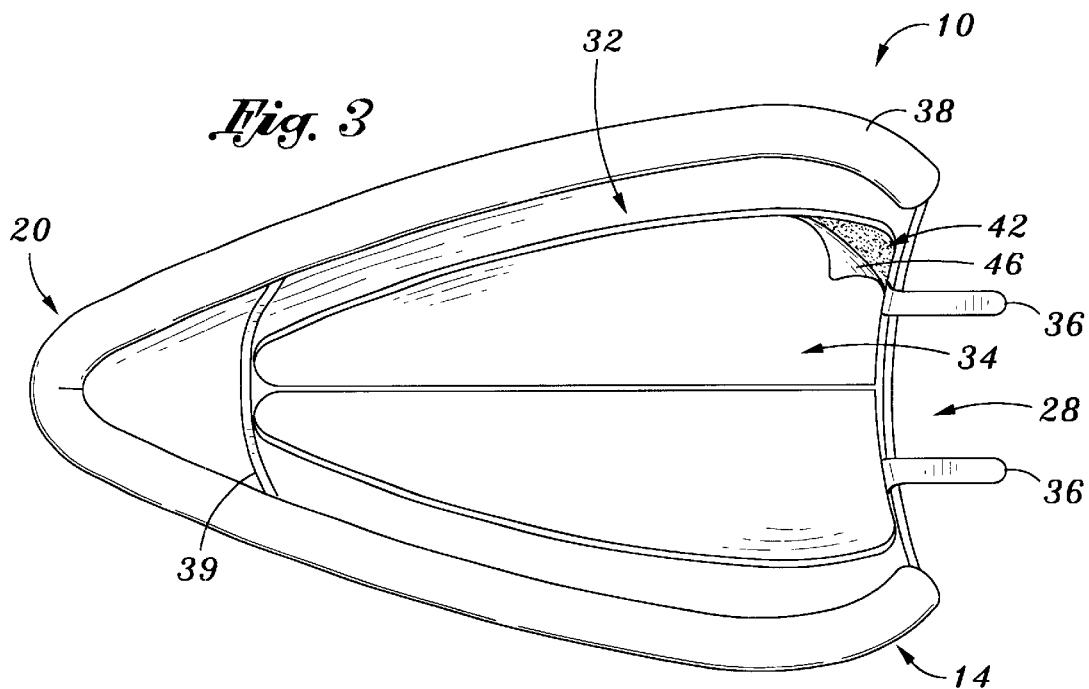
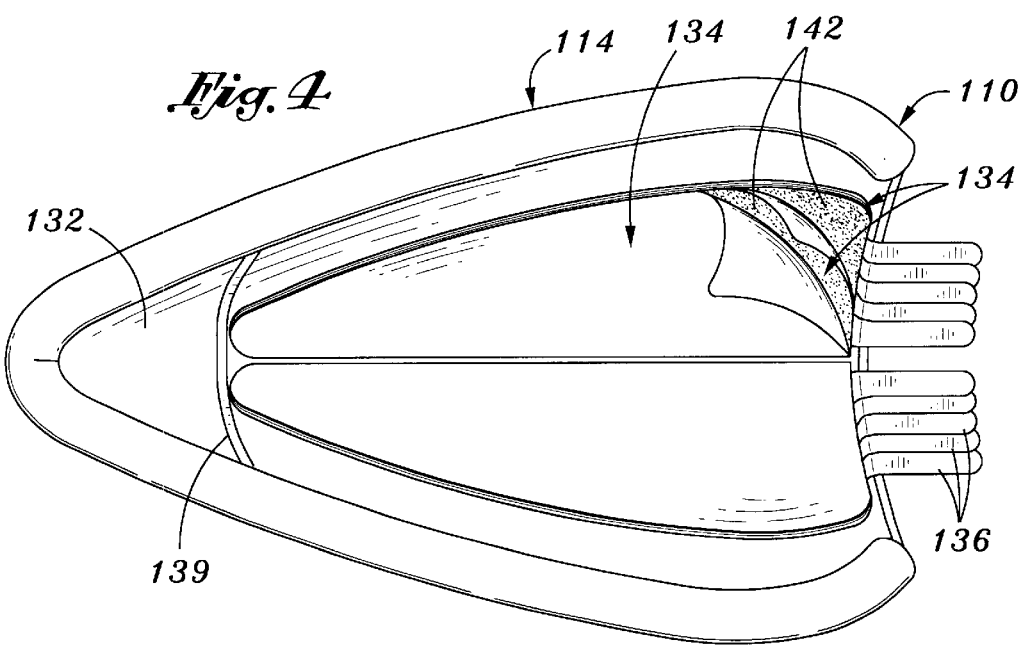

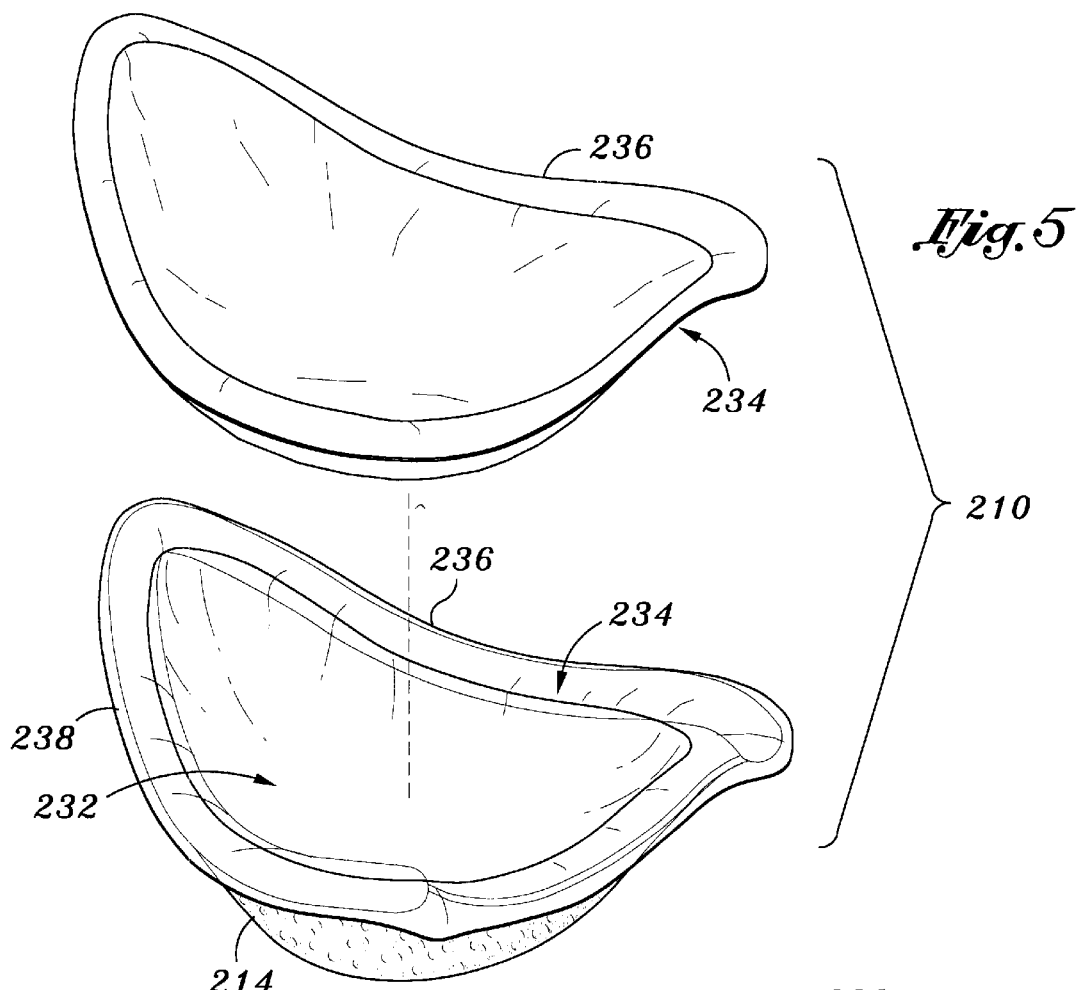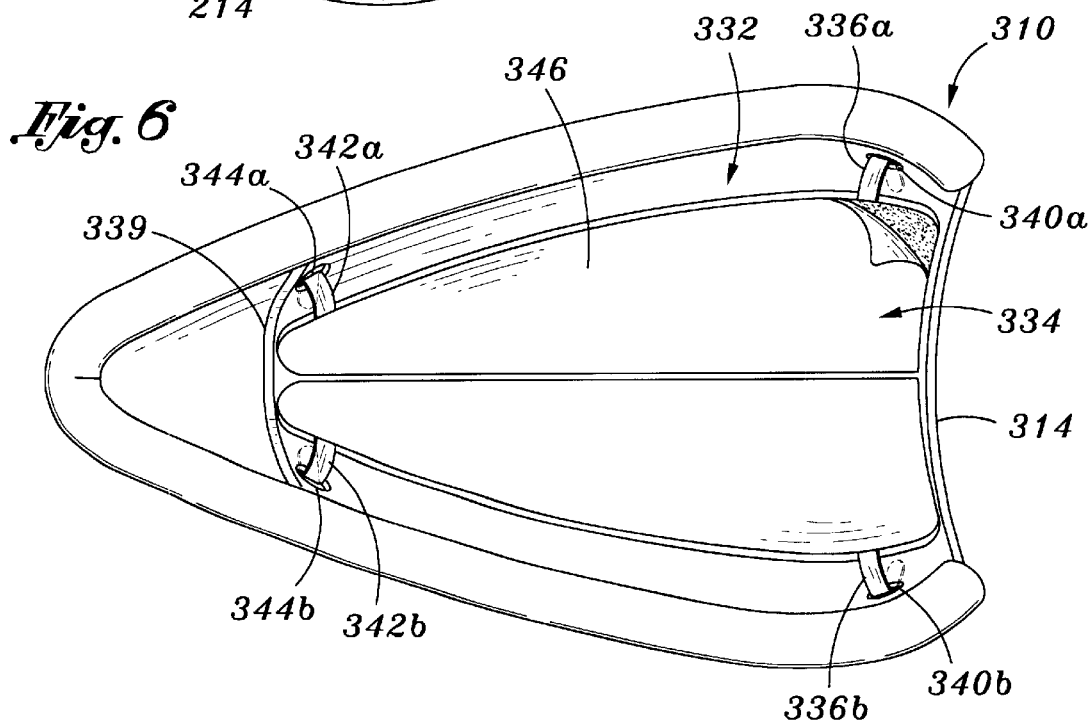

POOCH POOH CATCHER

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to a device for containing animal excrement and more particularly to a device adapted to be comfortably worn by the animal.

There are numerous prior art devices for the collection of excrement from an animal (i.e., especially a dog). The goal of the prior art devices is to contain the excrement of the dog before it reaches the ground thereby making cleanup simple and easy. With the advent of laws requiring owners to clean up after their animals, there is a need for a simple and effective device that can catch animal excrement before it reaches the ground.

Currently the prior art devices for containing animal excrement can be divided into two groups: diapers and bags. The diaper type of device is an absorbent material that is secured to the rear of the animal. In this respect, the diaper will contain a series of straps that surround the stomach and rear of the dog to secure the absorbent material to the animal's rear end. The straps must be brought forward and tightened on the animal to ensure that the absorbent material can catch the excrement from the animal. Typically, the straps will form a harness that draws the absorbent material against the rear end of the dog. This can be uncomfortable for the animal and lead to leakage difficulties if the harness is not adjusted correctly. Additionally, the absorbent material must be replaced once it has been used. If the diaper is drawn tightly against the animal's rear end in order to prevent leakage, there is the possibility that the excrement from the dog may come in contact with the fur of the animal thereby leading to a messy cleanup of the animal.

As previously mentioned, prior art excrement containers for dogs may also include bags. The bag is maintained in place over the rear end of the animal through the use of a harness. Typically, the harness is adapted with an opening that allows the waste from the animal to be directed into the bag. Once the dog has excreted waste into the bag, the bag is disposed. However, bag type devices are unattractive and uncomfortable for the animal because the bag hangs from the rear end of the animal. Additionally, the bags must be custom-made for the harness and thus replaced with the same type of bag. In this respect, if the owner of the dog exhausts his or her supply of bags, then the dog owner cannot use the harness to catch the dog's excrement.

The present invention addresses the above-mentioned deficiencies in the prior art devices by providing a device that can collect an animal's waste in a sanitary and simple method. The device of the present invention can collect animal waste before it reaches the ground in a manner that is comfortable and attractive for the dog. Furthermore, the device of the present invention can be applied to the animal quickly (i.e., in less than one minute).

BRIEF SUMMARY OF THE INVENTION

An excrement catching device for a dog wherein the dog has a tail, a rear end and a stomach portion. The device comprises a receptacle sized and configured to be placeable over the rear end of the dog. The receptacle has a rear portion and a forward portion for attachment of a stomach strap and a tail strap. The tail strap is placeable over the tail of the dog and attached to the rear portion of the receptacle. The tail strap is operative to secure the receptacle to the tail of the dog. The stomach strap is placeable around the stomach portion of the dog and attached to the forward portion of the receptacle. Accordingly the stomach strap and the tail strap position the receptacle in a location whereat the receptacle will catch the excrement of the dog.

In the preferred embodiment of the present invention, the receptacle is fabricated from a plastic type material and has a generally cup shape configuration. The receptacle has a wide rear portion that tapers into a narrow front portion. Both the stomach and tail straps may be removably attached to the receptacle and adjustable through the use of Velcro.

It is contemplated that the device further includes a liner disposed within the receptacle and operative to catch the excrement of the dog. The liner is removable from the receptacle for disposal of the liner and cleanup of the receptacle. The liner may be a plurality of liners stacked on top of one another. In this instance, after a liner has been used, it is removed to expose a new, clean liner. The liner may include at least one tab for facilitating attachment to the receptacle.

In accordance with the preferred embodiment of the present invention there is provided a method of securing an excrement catching device to a dog. The method comprises positioning the receptacle over the rear of the dog and then attaching the forward portion of the receptacle to the stomach portion of the dog with the stomach strap, and then attaching the rear portion of the receptacle to the tail of the dog with the tail strap. The stomach strap is placed round the stomach portion of the dog in order to attach the receptacle and the tail strap is placed around the tail of the dog in order to attach the receptacle to the tail of the dog.

BRIEF DESCRIPTION OF THE DRAWINGS

These as well as other features of the present invention will become more apparent upon reference to the drawings wherein:

FIG. 2 is a perspective view of the excrement catching device shown in FIG. 1;

FIG. 3 is a top plan view of the excrement catching device shown in FIGS. 1 and 2;

FIG. 4 is a top plan view of a second embodiment of the excrement catching device;

FIG. 5 is a perspective view of a third embodiment of an excrement catching device of the present invention; and FIG. 6 is a top plan view of a third embodiment of the excrement catching device.

DETAILED DESCRIPTION OF THE INVENTION

Figure 1:
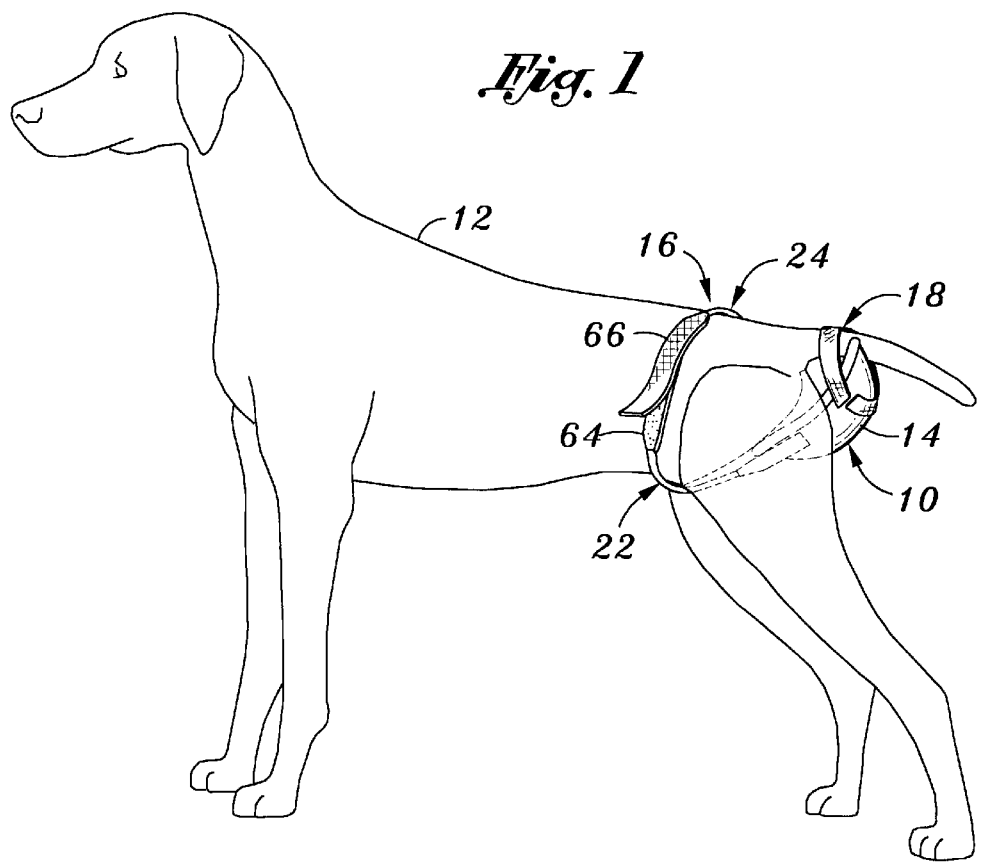
FIG. 1 is a perspective view of an excrement catching device constructed in accordance with the present invention and secured to a dog.
Figure 1A:
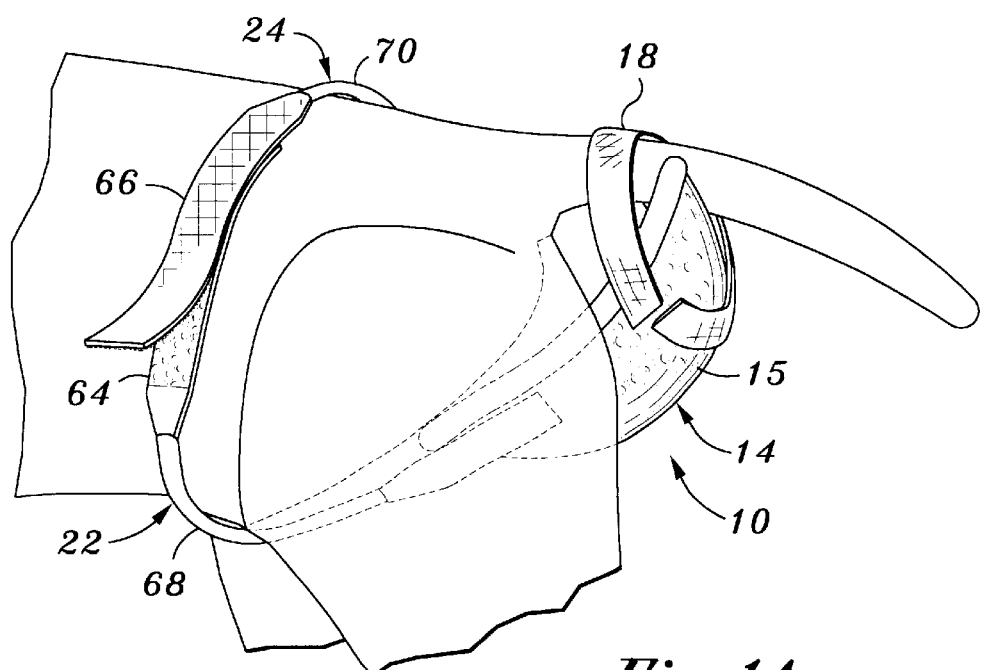
FIG. 1a is an enlarged view of the excrement catching device shown in FIG. 1.

Referring now to the drawings wherein the showings are for purposes of illustrating a preferred embodiment of the present invention only, and not for purposes of limiting the same, FIG. 1 illustrates an excrement catching device 10

(i.e., Pooch Pooh Catcher) secured to the rear end of a dog 12. The excrement catching device 10 comprises a cup like receptacle 14 secured to the dog with a stomach strap 16 and a tail strap 18, as will be further explained below.

As seen in FIGS. 1 and 2, the stomach strap 16 is attached to a forward portion 20 of the receptacle 14 such that the stomach strap 16 is led between the animal's legs and around the stomach area of the dog 12. The stomach strap 16 comprises a first strap 22 and a second strap 24 attached to an outer surface of the receptacle 14. Each of the first and second straps 22, 24 wrap around the animal and are secured to each other through the use of Velcro, as seen in FIG. 1. Specifically, the first strap portion 22 contains a receptacle attachment portion 60 attachable to the receptacle 14 and the second strap 24 comprises a receptacle attachment portion 62 attachable to the receptacle 14. Disposed on an outer end of each of the first and second straps 22, 24 is a respective strap attachment portion 64, 66. Each of the first and second straps 22, 24 includes a respective elastic center portion 68, 70. Accordingly, the first strap 22 comprises receptacle attachment portion 60 attached to elastic center portion 68 which in turn is attached to strap attachment portion 64. Similarly, the second strap 24 comprises receptacle attachment portion 62 attached to elastic center portion 70 which is in turn attached to strap attachment portion 66. In the preferred embodiment, the receptacle attachment portions 60, 62 of the first and second straps 68, 70 are fabricated from velcro and the strap attachment portions 64, 66 are additionally fabricated from velcro. The velcro of the first and second straps 22, 24 facilitates attachment thereof to the receptacle 14 and securement around the stomach portion of the dog 12, as will be further explained below.

Referring to FIGS. 1 and 2, the tail strap 18 is fabricated a velcro material attachable to the receptacle 14 and around the tail of the dog 12. The tail strap 18 is configured to maintain a rear portion 28 of the receptacle 14 in contact with the tail of the dog 12. As seen in FIG. 1, the tail strap 18 is attached to an outer surface of the receptacle 14 and is wrapped over the tail of the dog 12. The ends of the tail strap 18 are attached to the outer surface of the receptacle 14, as will be further explained below. The tail strap 18 may be cut to the correct length such that when the receptacle 14 is in the correct position, the length of the strap 18 will not be excessive.

Referring to FIGS. 1 and 2 the outer surface of the receptacle 14 is covered with velcro 15. Typically, the loop portion of the velcro 15 covers the outer surface of the receptacle 14. In this respect, the velcro of the tail strap 18 and the receptacle attachment portions 60, 62 of the first and second straps 22, 24 are attachable to the velcro 15 of the receptacle 14. Therefore, the tail strap 18, as well as the receptacle attachment portions 60, 62 will contain velcro hooks that are securable to the velcro 15 on the outer surface of the receptacle 14. By providing velcro 15 of the receptacle 14, the first and second straps 22, 24 of the stomach strap 16 and the tail strap 18 are easily positionable around the outer surface of the receptacle 14 such that the receptacle 14 may be positioned on the dog 12 in a comfortable position. In this regard, the stomach strap 16 and the tail strap 18 may be positionable on the receptacle 14 in a location whereat the receptacle 14 is comfortably placed on the dog 12, yet can still catch excrement from the dog 12. The velcro 15 allows quick and easy securement of the receptacle 14 to the dog and adaptability of positioning the receptacle 14 in such instances where the receptacle 14 is to be placed on differing sizes of dogs 12. It will be recognized that instead of covering the entire outer surface of the receptacle 14 with the velcro 15, strips of velcro 15 may be placed around the outer surface thereof in a location whereat the stomach strap 16 and the tail strap 18 are expected to make contact with the outer surface of the receptacle 14.

In accordance with the preferred embodiment of the present invention, the receptacle 14 is a generally triangularly cup-shaped structure having a wide rear portion 28 that transitions into a pointed forward portion 20. The wide rear portion 28 contains a tail receiving contour 30 sized and configured complementary to the shape of the tail of the dog 12. The tail receiving contour 30 is in abutting contact with the underside of the tail of the dog 12 when the receptacle 14 is in the proper position. As previously mentioned above, the tail strap 18 maintains the receptacle 14 and hence the tail receiving contour 30 in abutting contact with the tail of the dog 12. Accordingly, the tail receiving contour 30 and the tail strap 18 position the rear portion 28 of the receptacle at the rear of the dog 12. The tail strap 18 cinches the tail receiving contour 30 against the underside of the tail of the dog 12 in order to provide a secure, yet comfortable attachment method. The forward portion 20 of the receptacle is narrow in order to be placed between the legs of the dog 12 in a comfortable manner. The forward portion 20 of the receptacle 14 is maintained in position by the stomach strap 16. The forward portion 20 may be sized and configured to match the contours of the underside of the dog 12 in order to provide comfort to the dog 12. The tail strap 18 and the stomach strap 16 therefore form a triangular attachment method for securing the receptacle 14 in a location whereat excrement from the dog 12 will fall therein.

The receptacle 14 may be fabricated from a soft plastic-like material. In this regard, the receptacle 14 may be formed through conventional molding techniques into an invaginated cup shape that is sized to receive the excrement from the dog 12. The receptacle 14 will therefore have a cavity 32 sized to contain the waste from the animal 12. The cavity 32 is defined by the inner surfaces of the receptacle 14 such that the invaginated shape of the receptacle 14 defines the shape of the cavity 32. The invaginated shape of the receptacle 14 allows the excrement to be contained therein without contacting the dog 12. Additionally, the low profile of the receptacle 14 allows the dog 12 to remain squatting while excreting waste. This may be beneficial for older and immobile dogs 12. The receptacle 14 includes an outer lip 38 bounding the periphery of the receptacle 14. The outer lip 38 provides additional strength to the receptacle 14, as well as a comfortable contact surface for the dog 12. The outer lip 38 may be formed from a soft foam-like material to provide additional cushioning to the dog 12 when the receptacle 14 is secured thereon. By forming the lip 38 from a cushioning material, the outer lip 38 may be compressible such that the receptacle 14 is tightly positioned against the fur of the dog 12.

Disposed within the cavity 32 of the receptacle 14 is an inner lip 39. The inner lip 39 may be formed of the same material as the receptacle 14 (i.e., plastic). The inner lip 39 is a wall-like structure extending from the inner surface of the cavity 32 to the outer lip 38. In this regard, the inner lip 39 forms a barrier that prevents excrement from the dog 12 from falling into a lower portion of the receptacle 14 when attached thereon. Additionally, the inner lip 39 positions a removable liner 34 within the receptacle 14, as will be further explained below.

Disposed within the cavity 32 is the removable liner 34 that is fabricated from a pliable paper or plastic material that is contourable to the shape of the cavity 32. The liner 34 contains an adhesive on the upper surface thereof thereby forming a tacky surface 42. The liner 34 additionally contains a protective covering 46 which is removable from the tacky surface 42. The protective covering 46 is a plastic film which covers the tacky surface 42 of the liner 34, such that when the liner 34 is not in use, the tacky surface 42 will not be exposed. The tacky surface 42 is typically an adhesive material that can adhere to the excrement of the dog 12. As will be recognized, the liner 34 is positioned within the receptacle 14 in a location whereat the excrement of the dog 12 is expected to fall. In this regard, the liner 34 covers the inner surface of the receptacle 14 and is positioned thereon by the inner lip 39.

The liner 34 includes two tabs 36, 36 formed thereon. Each of the tabs 36, 36 is formed from a pliable metallic material and projects outwardly from the liner 34 at the rear portion 28 of the receptacle 14. The tabs 36, 36 are formed on the liner 34 such that they are not positioned within the cavity 32. Accordingly, excrement from the dog 12 will not contact the tabs 36, 36. As seen in FIG. 2, each of the tabs 36, 36 is in a position whereat the tabs 36, 36 may be bent around toward the exterior surface of the receptacle 14. In this respect, the tabs 36, 36 are prevented from interfering with the placement of the tail receiving contour 30 against the tail of the dog 12. Additionally, by bending the tabs 36, 36 toward the exterior of the receptacle 14, the tabs 36, 36 are further prevented from coming into contact with the excrement of the dog 12. Each of the tabs 36, 36 further secures the liner 34 within the receptacle 14. As previously mentioned, the liner 34 is contoured to the shape of the interior of the receptacle 14 and are positionable therein by the inner lip 39. By bending the tabs 36, 36 around the exterior surface of the receptacle 14, the tabs 36, 36 maintain the liner 34 within the receptacle 14. In this respect, it is not necessary to use adhesives or any other types of securement method in order to prevent the liner 34 from being inadvertently removed from the receptacle 14.

The careful removal of the liner 34 will remove any excrement contained within the receptacle 14. The excrement contained within the cavity 32 is removed by pulling the liner 34 away from the receptacle 14 with the tabs 36, 36. Preferably, the excrement is removed by holding the receptacle 14 over a proper disposal container (i.e., trash can) and then pulling the liner 34 from the receptacle 14 with the tabs 36, 36. The liner 34 and the excrement contained thereon is then properly disposed of in the container. In this regard, the excrement is removed from the receptacle 14 without the user having to touch the excrement. The tacky surface 42 of the liner 34 secures the excrement to the liner 34 during disposal thereof.

As seen in FIG. 1, the excrement catching device 10 is sized to cover the rear of the dog 12. Therefore, it is contemplated that the receptacle 14 may be fabricated in different sizes in order to fit the dog 12. Typically, the receptacle 14 will be made in a small, medium, and large sizes with correspondingly sized straps 16 and 18 in order to fit the dog 12. For instance, large dogs such as Golden Retrievers and German Shepherds would use a large receptacle 14. However, poodles and terriers would use a small receptacle 14.

As previously mentioned, the first and second strap portions 22, 24 of the stomach strap 16 contain respective elastic center portions 68, 70. As will be recognized, the elastic center portions 68, 70 allow the first and second strap portions 22, 24 to stretch when secured around the stomach of the dog 12. Therefore, the ability of the stomach strap 16 to stretch facilitates securement of the receptacle 14 to differing sizes of dogs. Additionally, by allowing the stomach strap 16 to stretch, the receptacle 14 is more likely to remain in place while the dog 12 is running, jumping, or sitting. The ability of the stomach strap 16 to stretch also allows the receptacle 14 to be positioned in a location whereat the receptacle 14 may catch the excrement of the dog 12 when the dog 12 raises its tail.

The excrement catching device 10 is preferably used by first removing the protective covering 46 of a respective liner 34. Next, the liner 34 is placed within the cavity 32 of the receptacle 14. As previously mentioned, the liner 34 is secured to the receptacle 14 through the use of tabs 36. Once the liner 34 is secured within the cavity 32, the receptacle 14 may be placed on the dog 12. Typically, the tail strap 18 is attached to one side of the velcro 15 on the outer surface of the receptacle 14. The tail strap 18 is then led over the dog's tail and secured to an opposite side of the receptacle 14. Next, the stomach strap 16 is attached to the velcro 15 of the receptacle 14. The stomach strap 16 is led around the stomach portion of the dog 12 such that strap attachment portions 64, 66 thereof are attached together to secure the stomach strap 16 to the dog 12. In order to remove the excrement catching device 10, the strap attachment portions 64, 66 are disengaged from one another, and the tail strap 18 is disengaged from the velcro 15 of the receptacle 14. It will be recognized that the order of placement of the tail strap 18 and the stomach strap 16 may be reversed for attachment and removal.

Referring to FIG. 4, a second embodiment of an excrement catching device 110 is shown. The second embodiment of the excrement catching device 110 comprises a receptacle 114 that is attachable to the stomach strap 16 and the tail strap 18, as previously described. The receptacle 114 comprises a cavity 132 with an inner lip 139 disposed therein. The second embodiment of the excrement catching device 110 includes a plurality of liners 134 stacked within the cavity 132. In this respect, each of the liners 134 is disposed above (i.e., on top of) a lower liner 134. Each of the liners 134 will contain an upper tacky surface 142 and a respective tab 136. Accordingly, each of the tabs 136 will be bent around the surface of the receptacle 114 in order to maintain a respective liner 134 in place. Additionally, an upper liner 134 will function as the protective surface for an adjacent lower liner 134. In this respect, upon removal and disposal of a top liner 134, the liner 134 underneath will be ready for use. The stacked layers of liners 134 therefore permit easy cleanup of the receptacle 114 for multiple uses.

Referring to FIG. 5, a third embodiment of an excrement catching device 210 is shown. The second embodiment of the excrement catching device 210 comprises a receptacle 214 that it attachable to the stomach strap 16 and the tail strap 18, as previously described. The excrement catching device 210 further includes an inner cavity 232 which may receive a plurality of contourable liners 234. Each of the liners 234 is fabricated into a complimentary shape of the interior of the receptacle 214. As seen in FIG. 5, each of the receptacles 234 includes a lip 236 bounding the periphery thereof. The lip 236 is in abutting contact with an outer lip 238 of the receptacle 214. Each of the liners 236 is fabricated from a plastic material that is insertable into the cavity 232 of the receptacle 214. In this respect, the liner 236 is easily removable from the receptacle 214 for disposal thereof when excrement from the dog 12 is contained therein. By stacking the liners 236 within the receptacle 214, once a used liner 236 is removed, a new clean liner 236 is available for use.

Referring now to FIG. 6, a fourth embodiment of an excrement catching device 310 is shown. In the third embodiment of the excrement catching device 310, a liner 334 is disposed within a cavity 332. The liner 334 includes a protective covering 346 removable from a top surface thereof. In order to maintain the liner 334 within the cavity 332, the liner 334 includes two rear tabs 336a, 336b led through respective openings 340a, 340b formed within the receptacle 314. As seen in FIG. 6, each of the rear tabs 336a, 336b are attached to the liner 334 on an outer edge thereof. The openings 340a, 340b are formed within the receptacle 314 in a location whereat the rear tabs 336a, 336b can be led therethrough. Each of the rear tabs 336a, 336b are pliable and may be wrapped around the exterior surface of the receptacle 314. Similarly, the liner 334 includes two front tabs 342a, and 342b. As seen in FIG. 6, each of the front tabs 342a and 342b are led through respective openings 344a and 344b. Each of the front tabs 342a, 342b wrap around the exterior of the receptacle 314 in order to secure the liner 334 thereto. Therefore, the combination of the front tabs 342a, 342b with respective openings 344a and 344b and rear tabs 336a, 336b with respective openings 340a, 340b secure the liner 334 within the receptacle 314. The fourth embodiment of the excrement catching device 310 further includes a inner lip 339 which aids in the positioning of the liner 334 within the receptacle 314. Additionally, the inner lip 339 aids in the catching of excrement from the dog 12.

Additional modifications and improvements of the present invention may also be apparent to those of ordinary skill in the art such as varying the shape of the receptacle 14 and adapting the shape of the receptacle 14 for other types of animals (i.e., cats, horses, etc. . . ). Thus, the particular combination of parts described and illustrated herein is intended to represent only a certain embodiment of the present invention, and is not intended to serve as limitations of alternative devices within the spirit and scope of the invention.

What is claimed is:

1. An excrement catching device of a dog having a tail, a rear end and a stomach portion, the device comprising:
    a receptacle formed to define an invaginated inner receiving surface, the receptacle being sized and configured to be placeable over the rear end of the dog, the receptacle having a rear portion and a forward portion;
    at least one liner removably adhered to the invaginated inner receiving surface, the liner having an adhesive upper surface formed thereon;
    a tail strap placeable over the tail of the dog and attached to the rear portion of the receptacle, the tail strap being operative to secure the receptacle to the tail of the dog; and
    a stomach strap placeable over the stomach portion of the dog and attached to the forward position of the receptacle, the stomach strap being operative to secure the receptacle adjacent to the stomach of the dog;
    wherein the stomach strap and the tail strap position the receptacle in a location whereat the liner adhesive upper surface disposed on the receptacle catches and maintains the excrement of the dog upon the adhesive liner so as to maintain the excrement in position to facilitate removal from the receptacle with the adhesive liner.

2. The device of claim 1 wherein the receptacle is rigid.

3. The device of claim 2 wherein the receptacle is formed from a plastic material.

4. The device of claim 1 wherein the receptacle tapers from a wide rear portion to a pointed front portion to provide a comfortable fit for the dog.

5. The device of claim 1 wherein the stomach strap and the tail strap are adjustable.

6. The device of claim 5 wherein the tail strap and the stomach strap are removably attached to the receptacle in order to secure the receptacle in abutting contact with the tail of the dog.

7. The device of claim 1 wherein the receptacle further includes a tail receiving contour in abutting contact with the tail of the dog.

8. The device of claim 1 wherein the liner is removable from the receptacle for disposal thereof.

9. The device of claim 1 further comprising a plurality of separately peelable adhesive liners disposed on top of one another within the receptacle.

10. The device of claim 1 wherein the top liner is removable from a lower liner for disposal of the top liner.

11. The device of claim 1 wherein the liner further includes at least one tab extending external to the receptacle to facilitate removal of the liner and retained excrement without the user touching excrement retained on the liner adhesive upper surface.

12. The device of claim 1 wherein the liner is contourable to the shape of the receptacle.

13. A method of securing an excrement catching device to a dog, the device having an invaginated receptacle with at least one liner, each liner(s) being removably adhered to the receptacle and having an upper adhesive surface for receiving and retaining excrement, a stomach strap, and a tail strap, the method comprising the steps of:
    a) positioning the receptacle over a rear of the dog;
    b) attaching a rear portion of the receptacle to a tail of the dog with the tail strap;
    c) attaching a forward portion of the receptacle to the dog with the stomach strap;
    d) catching an excrement of the dog upon the adhesive upper surface of the liner; and
    e) removing the liner from the receptacle with the excrement retained on the liner upper adhesive surface.

14. The method of claim 13 wherein step (b) comprises placing the tail strap over the tail of the dog in order to attach the rear portion of the receptacle to the dog.

15. The method of claim 13 wherein step (c) comprises placing the stomach strap around the stomach portion of the dog in order to secure the forward portion of the receptacle.

16. An excrement catching device adapted to secure to a rear end of a dog for catching an excrement extruding therefrom, the device comprising:
    a receptacle having a plurality of separately peelable adhesive liners disposed on top of one another within the receptacle, each liner(s) having an adhesive upper surface for receiving and retaining excrement, the receptacle being placeable over the rear end of the dog; and
    a strap mechanism operative to securely position the receptacle over the rear end of the dog to catch and maintain the excrement upon the adhesive layer so as to maintain the excrement in position to facilitate removal from the receptacle with the adhesive layer.

17. The device of claim 1 wherein the receptacle is a unitary member for directly supporting the excrement placed on the liner adhesive upper surface.

18. The device of claim 1 further comprising a soft outer lip around the perimeter of the receptacle to provide cushioning to the dog when the receptacle is secured thereon.

* * * * *